(12) United States Patent
Isozaki

(10) Patent No.: US 9,852,378 B2
(45) Date of Patent: Dec. 26, 2017

(54) INFORMATION PROCESSING APPARATUS AND INFORMATION PROCESSING METHOD TO ESTIMATE CAUSE-EFFECT RELATIONSHIP BETWEEN VARIABLES

(71) Applicant: SONY CORPORATION, Tokyo (JP)

(72) Inventor: Takashi Isozaki, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 625 days.

(21) Appl. No.: 14/270,552

(22) Filed: May 6, 2014

(65) Prior Publication Data

US 2014/0351198 A1 Nov. 27, 2014

(30) Foreign Application Priority Data

May 21, 2013 (JP) ................................ 2013-106909

(51) Int. Cl.
*G06F 17/00* (2006.01)
*G06N 7/00* (2006.01)

(52) U.S. Cl.
CPC .................... *G06N 7/005* (2013.01)

(58) Field of Classification Search
None
See application file for complete search history.

(56) References Cited

U.S. PATENT DOCUMENTS

| | | | | |
|---|---|---|---|---|
| 7,117,185 B1 * | 10/2006 | Aliferis | ................. | G06K 9/6296 706/12 |
| 2004/0153430 A1 * | 8/2004 | Sayad | ............... | G06F 17/30598 706/61 |
| 2008/0228676 A1 * | 9/2008 | Isozaki | ................. | G06N 7/005 706/12 |
| 2008/0279434 A1 * | 11/2008 | Cassill | ................. | G06Q 10/06 382/131 |
| 2012/0303572 A1 * | 11/2012 | Isozaki | ................ | G06K 9/6277 706/52 |
| 2013/0257873 A1 * | 10/2013 | Isozaki | ................. | G06T 11/206 345/440 |
| 2014/0351198 A1 * | 11/2014 | Isozaki | .................. | G06N 7/005 706/54 |
| 2016/0085880 A1 * | 3/2016 | Sheffer | ............ | G06F 17/30619 707/741 |

OTHER PUBLICATIONS

Dimitris Margaritis, "Learning Bayesian Network Model Structure from Data", May 2003, pp. 1-126.*

(Continued)

*Primary Examiner* — Paulinho E Smith
(74) *Attorney, Agent, or Firm* — Chip Law Group

(57) ABSTRACT

Provided is an information processing apparatus that tests independence between multiple variables, the information processing apparatus including: a discretization section that discretizes at least one numerical variable on the basis of at least one categorical variable, when the categorical variable and the numerical variable are included in at least two dependent variables in a graphical model and a set of conditional variables serving as conditions of independence between the two variables; and a test execution section that executes a test for conditional independence between the two variables by using the categorical variable and a discrete variable which is obtained by discretizing the numerical variable.

12 Claims, 13 Drawing Sheets

(56) References Cited

OTHER PUBLICATIONS

Peter Spirtes, et al., "Causal Inference in the Presence of Latent Variables and Selection Bias", In Proceedings of Eleventh Conference on Uncertainty in Artificial Intelligence, 1995, pp. 499-506, Morgan Kaufmann, San Francisco, CA.
Peter Spirtes, et al., "Heuristic Greedy Search Algorithms for Latent Variable Models" in AI & STAT '97, 1997, pp. 481-488.
Peter Spirtes, et al., "Causation, Prediction, and Search" 1993, Springer-Verlag Lecture Notes in Statistics 81, New York, pp. 1-526.
Nir Friedman, et al., "Discretizing Continuous Attributes While Learning Bayesian Networks", Proceedings of the Thirteenth International Conference on Machine Learning, 1996, pp. 1-9.
Stefano Monti, et al., "A Multivariate Discretization Method for Learning Bayesian Networks from Mixed Data", in proceedings of the Fourteenth Conference of Uncertainty in AI, 1998, pp. 404-413.
Harold Steck, et al., "Predictive Discretization during Model Selection", Pattern Recognition, Lecture Notes in Computer Science vol. 3175, 2004, pp. 1-8.
Usama M. Fayyad, et al., "Multi-Interval Discretization of Continuous-Valued Attributes for Classification Learning", Proceedings of the International Joint Conference on Uncertainty in AI, 1993, pp. 1022-1027.

\* cited by examiner

FIG. 1
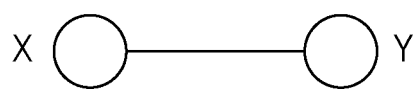
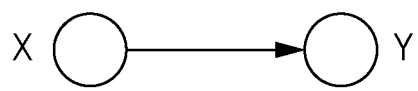
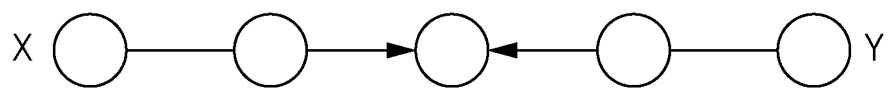

US 9,852,378 B2

INFORMATION PROCESSING APPARATUS AND INFORMATION PROCESSING METHOD TO ESTIMATE CAUSE-EFFECT RELATIONSHIP BETWEEN VARIABLES

CROSS REFERENCE TO RELATED APPLICATIONS

This application claims the benefit of Japanese Priority Patent Application JP 2013-106909 filed May 21, 2013, the entire contents of which are incorporated herein by reference.

BACKGROUND

The present technology relates to an information processing apparatus, an information processing method, and a program. In particular, the present technology relates to an information processing apparatus, an information processing method, and a program capable of estimating a cause-effect relationship between multiple variables.

In the related art, estimation of a statistical cause-effect relationship from observed data on multivariate random variables is roughly classified into a method of maximizing, as a score, a result of estimation based on the information amount criterion, the maximum penalized likelihood method, or the Bayes method (hereinafter referred to as a first estimation method), and a method of performing estimation through a statistical test for conditional independence between variables (hereinafter referred to as a second estimation method). The cause-effect relationship between variables is usually expressed as a graphical model (acyclic model) for the sake of readability of the result.

FIG. 1 shows examples of three graphical models indicating the cause-effect relationships between a variable X and a variable Y.

In the graphical model shown in the upper part of FIG. 1, the cause-effect relationship between the variable X and the variable Y is unclear, and the variable X and the variable Y serve as vertexes connected to each other through an edge (undirected edge) having no direction. In the graphical model shown in the middle part of FIG. 1, the cause-effect relationship between the variable X and the variable Y is that the variable X corresponds to the cause and the variable Y corresponds to the effect, and the variable X and the variable Y serve as vertexes connected to each other through an edge (directed edge) indicating a direction from the cause to the effect. In the graphical model shown in the lower part of FIG. 1, the variable X and the variable Y serve as vertexes connected to each other through three variables and edges that connect the variables. In the graphical model shown in the lower part of FIG. 1, the three variables and the edges that connect the variables form a path between the variable X and the variable Y, and the path may partially include directed edges indicating directions.

However, the second estimation method may possibly estimate presence of a latent common cause variable, and an algorithm thereof is disclosed in, for example, the following documents: P. Spirtes, C. Meek, and T. Richardson, "Causal Inference in the Presence of Latent Variables and Selection Bias", Proceedings of Conference on Uncertainty in Artificial Intelligence, pp. 499-506, 1995; P. Spirtes, T. Richardson, and C. Meek, "Heuristic Greedy Search Algorithms for Latent Variable Models", Proceedings of International Workshop on Artificial Intelligence and Statistics, pp. 481-488, 1996; P. Spirtes, C. Glymour, and R. Scheines, "Causation, Prediction, and Search", MIT Press, second edition, 2000; and the like. The model expressed thereby is called a mixed ancestral graph or the like (refer to P. Spirtes, T. Richardson, and C. Meek, "Heuristic Greedy Search Algorithms for Latent Variable Models", Proceedings of International Workshop on Artificial Intelligence and Statistics, pp. 481-488, 1996).

In the second estimation method, the random variable to be normally used is set as either of categorical data (categorical variable), which is a discrete value, and numerical data (numerical variable) which is a continuous value. For example, when the random variable is a categorical variable, the cause-effect relationship is modeled as a Bayesian network model. Alternatively, when the random variable is a numerical variable, the cause-effect relationship is modeled as a structural equation model (refer to P. Spirtes, C. Glymour, and R. Scheines, "Causation, Prediction, and Search", MIT Press, second edition, 2000).

On the other hand, in the first estimation method, a way of estimating and modeling the cause-effect relationship from the multivariate random variables, in which the categorical variable and the numerical variable are mixed, is disclosed in the following documents: N. Friedman and M. Goldszmidt, "Discretizing Continuous Attributes while Learning Bayesian Networks", Proceedings of International Conference on Machine Learning, pp. 157-165, 1996; S. Monti and G. Cooper, "A Multivariate Discretization Method for Learning Bayesian Networks from Mixed Data", Proceedings of Conference on Uncertainty in Artificial Intelligence, pp. 404-413, 1998; H. Steck and T. S. Jaakkola, "Predictive Discretization during Model Selection", JMLR workshop and conference proceedings, volume 2: Proceedings of the Eleventh International Conference on Artificial Intelligence and Statistics, pp. 532-539, 2007; and the like. However, it is difficult to apply the modeling and estimating way to the second estimation method. Consequently, when the categorical variable and the numerical variable are mixed in multiple variables, it is difficult to build a model called a partial ancestral graph or a mixed ancestral graph according to analysis of a method of presence of a latent variable, particularly important as a practical application.

However, a technique of categorizing (discretizing) the numerical variable on the basis of a certain categorical variable and the data is disclosed in for example the following document: U. M. Fayyad and K. B. Irani, "Multi-Interval Discretization of Continuous-Valued Attributions for Classification Learning", Proceedings of International Joint Conference on Artificial Intelligence, pp. 1022-1029, 1993.

According to this technique, in a classification learner in which the categorical variable is set as an output variable, when an attribute variable called the attribute having an effect on the output variable is a numerical variable, on the basis of the previous output data and the output variable which is the categorical variable, it is possible to discretize the corresponding attribute variable.

SUMMARY

However, in the model expressing the statistical cause-effect relationship, all variables may be output variables. That is, it is difficult to assign specific labels such as the output variable and the attribute variable to the categorical variable and the numerical variable, and it is difficult to determine, in advance before building a model, whether to discretize the numerical variable on the basis of a certain categorical variable.

Accordingly, in a system in which the categorical variable and the numerical variable are mixed in multiple variables, it is difficult to estimate the cause-effect relationship between multiple variables.

According to the present technology, it is desirable to estimate the cause-effect relationship between multiple variables, on the basis of the conditional independence test, even when the categorical variable and the numerical variable are mixed in the multiple variables.

According to an embodiment of the present technology, there is provided an information processing apparatus that tests independence between multiple variables, the information processing apparatus including: a discretization section that discretizes at least one numerical variable on the basis of at least one categorical variable, when the categorical variable and the numerical variable are included in at least two dependent variables in a graphical model and a set of conditional variables serving as conditions of independence between the two variables; and a test execution section that executes a test for conditional independence between the two variables by using the categorical variable and a discrete variable which is obtained by discretizing the numerical variable.

When one of the two variables is the categorical variable, the discretization section may discretize the other of the two variables and the numerical variable included in the set of conditional variables, on the basis of one of the two variables.

When only any one of variables constituting the set of conditional variables is the categorical variable, the discretization section may discretize the two variables and the other variables constituting the set of conditional variables, as the numerical variables, on the basis of the categorical variable.

The information processing apparatus may further include a determination section that determines whether or not the independence between the two variables is rejected, in any of the tests for conditional independence between the two variables, when the tests for conditional independence between the two variables are executed by respectively using the two or more categorical variables. When it is determined that the independence between the two variables is rejected, the test execution section may terminate execution of the test for conditional independence between the two variables.

When both of the two variables are the categorical variables, in any of the tests for conditional independence between the two variables executed by respectively using the two variables, the determination section may determine whether or not the independence between the two variables is rejected.

When both of the two variables are the numerical variables and the set of conditional variables includes the two or more categorical variables, in any of tests for conditional independence between the two variables executed by respectively using the categorical variables, the determination section may determine whether or not the independence between the two variables is rejected.

After the tests for conditional independence between the two variables are executed on a predetermined number of pairs of variables, in any of the tests for conditional independence between the two variables executed by respectively using the categorical variables, the determination section may determine whether or not the independence between the two variables is rejected.

When there is a plurality of the categorical variables which are criteria of discretization, the discretization section may discretize the numerical variable on the basis of the categorical variable which is designated by a user.

The categorical variable may include at least a variable which categorizes persons. The numerical variable may include at least a variable which indicates a numerical value of a human body.

The categorical variable may include at least a variable which categorizes either or both of a product and a manufacturing apparatus that manufactures the product. The numerical variable may include at least a variable which indicates a value relating to either or both of the product and an environment where the product is manufactured.

According to another embodiment of the present technology, there is provided an information processing method of causing an information processing apparatus to test independence between multiple variables, the information processing method including: discretizing at least one numerical variable on the basis of at least one categorical variable, when the categorical variable and the numerical variable are included in at least two dependent variables in a graphical model and a set of conditional variables serving as conditions of independence between the two variables; and executing a test for conditional independence between the two variables by using the categorical variable and a discrete variable which is obtained by discretizing the numerical variable.

According to a further embodiment of the present technology, there is provided a program causing a computer to execute processes for testing independence between multiple variables, the processes including: discretizing at least one numerical variable on the basis of at least one categorical variable, when the categorical variable and the numerical variable are included in at least two dependent variables in a graphical model and a set of conditional variables serving as conditions of independence between the two variables; and executing a test for conditional independence between the two variables by using the categorical variable and a discrete variable which is obtained by discretizing the numerical variable.

In the embodiment of the present technology, at least one numerical variable is discretized on the basis of at least one categorical variable, when the categorical variable and the numerical variable are included in at least two dependent variables in a graphical model and a set of conditional variables serving as conditions of independence between the two variables, and a test for conditional independence between the two variables is executed by using the categorical variable and a discrete variable which is obtained by discretizing the numerical variable.

According to the embodiment of the present technology, it is possible to estimate the cause-effect relationship between multiple variables, on the basis of the conditional independence test, even when the categorical variable and the numerical variable are mixed in the multiple variables.

BRIEF DESCRIPTION OF THE DRAWINGS

FIG. 1 is a diagram illustrating an example of a graphical model;

DETAILED DESCRIPTION OF EMBODIMENTS

Hereinafter, an embodiment of the present technology will be described with reference to the accompanying drawings.

Hardware Configuration Example of Information Processing Apparatus

Figure 2:
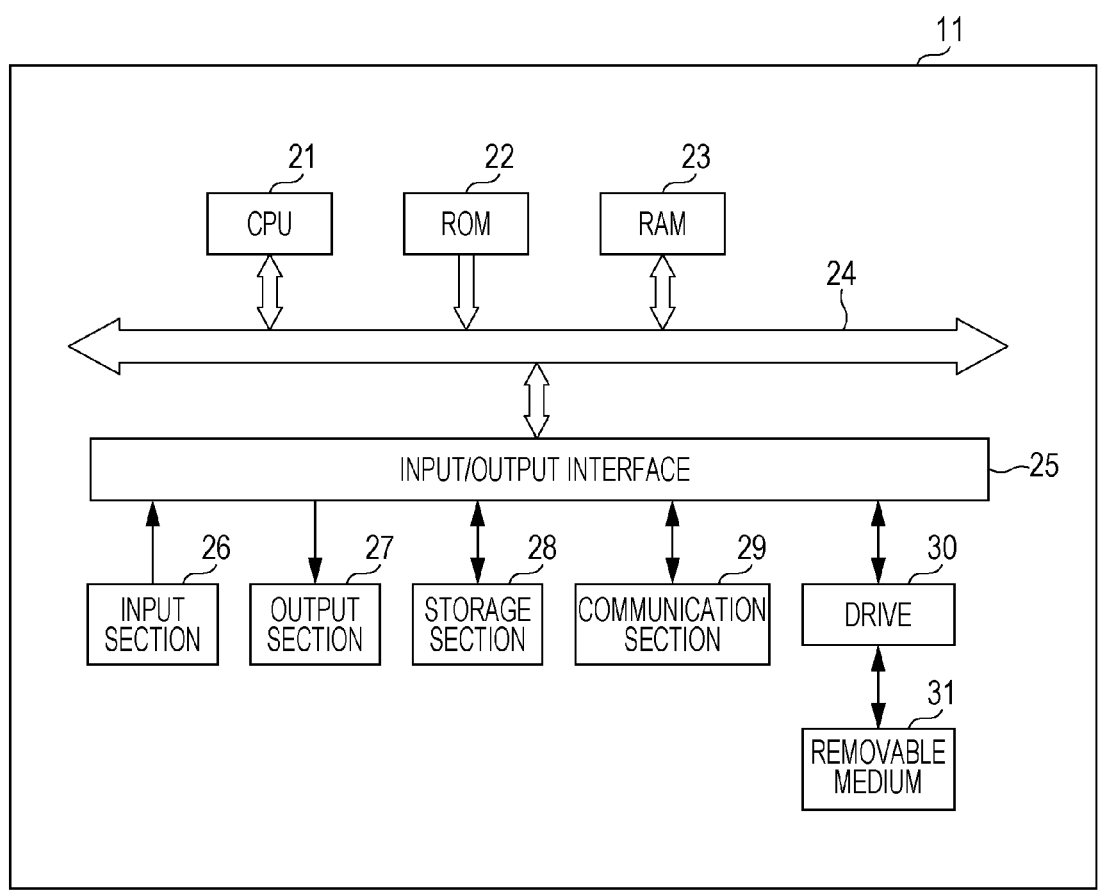
FIG. 2 is a block diagram illustrating a hardware configuration example of an information processing apparatus.

FIG. 2 shows a hardware configuration example of an information processing apparatus 11 according to an embodiment of the present technology.

The information processing apparatus 11 tests the independence or conditional independence between multivariate random variables, and outputs the result as a directed graph, an undirected graph, a partially directed graph, a mixed ancestral graph, a partially ancestral graph, and the like. In addition, in the present technology, on the basis of the result of the independence test or test for conditional independence between the multivariate random variables, presence of dependence between the variables is represented as an undirected edge. Then, the cause-effect relationship is estimated by giving a direction to a part of the undirected edge on the basis of the partially directing technique which is disclosed in "Causal Inference in the Presence of Latent Variables and Selection Bias", "Heuristic Greedy Search Algorithms for Latent Variable Models", "Causation, Prediction, and Search", and the like. However, in the present specification, regarding the directing technique, the detailed description will be omitted.

The information processing apparatus 11 may be formed as, for example, a personal computer, and may have a configuration similar to that of the personal computer.

The information processing apparatus 11 includes a central processing unit (CPU) 21, a read only memory (ROM) 22, a random access memory (RAM) 23, a bus 24, an input/output interface 25, an input section 26, an output section 27, a storage section 28, a communication section 29, and a drive 30.

In the information processing apparatus 11, the CPU 21, the ROM 22, and the RAM 23 are connected to each other through the bus 24. The input/output interface 25 is further connected to the bus 24. To the input/output interface 25, the input section 26 such as a keyboard, a mouse, and a touch panel, the output section 27 such as a display and a speaker, the storage section 28 such as a hard disk and a non-volatile memory, and the communication section 29 such as a network interface are connected.

The drive 30 is further connected to the input/output interface 25 as necessary. A removable medium 31 such as a magnetic disk, an optical disc, a magneto-optical disk, and a semiconductor memory is mounted to the drive 30 as appropriate. A program read from the removable medium 31 is installed in the storage section 28 as necessary.

Further, the program can be received by the communication section 29 through a wired or wireless transfer medium to be installed in the storage section 28. Besides, the program can be installed in advance in the ROM 22 or the storage section 28.

The program executed by the information processing apparatus 11 may be processed chronologically in accordance with the order described in the present specification, or may be processed in parallel or at an appropriate timing when a call is made, for example.

Functional Configuration Example of Information Processing Apparatus

Figure 3:
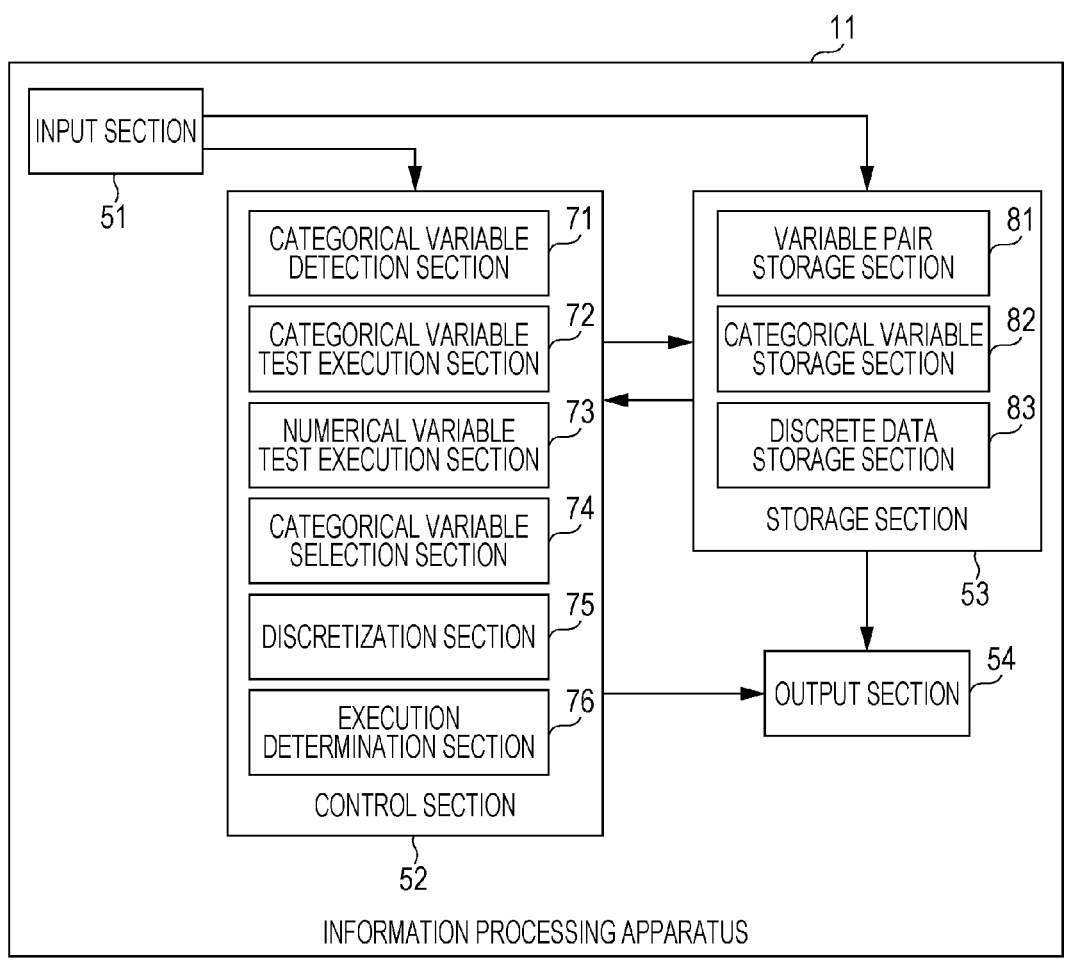
FIG. 3 is a block diagram illustrating a functional configuration example of an information processing apparatus according to an embodiment of the present technology.

FIG. 3 shows a functional configuration example of a portion of the information processing apparatus 11 according to the embodiment of the present technology.

The information processing apparatus 11 of FIG. 3 includes an input section 51, a control section 52, a storage section 53, and an output section 54.

The input section 51 corresponds to the input section 26 of FIG. 2. The input section 51 receives inputs of an argument for designating two variables to be subjected to an independence test, among N random variables, a variable set of conditional variables that serve as conditions for conditional independence, and the like, receives designation of a degree of significance and a statistical amount used in the conditional independence test, and supplies information corresponding to the contents of the inputs to the control section 52.

The control section 52 corresponds to the CPU 21 of FIG. 2. The control section 52 operates in accordance with a program stored in the storage section 53 which corresponds to the storage section 28 of FIG. 2, and executes a test for the independence between two variables focused upon by using various kinds of information stored in the storage section 53, thereby estimating a cause-effect relationship between variables.

Generally, in estimation of the cause-effect relationship between variables, when the test for conditional independence between variables is executed, a hypothesis in which conditional independence is established therebetween is set as a null hypothesis. When the null hypothesis is rejected, it is assumed that there is dependence between variables. In contrast, when the null hypothesis is not rejected, it is assumed that there is independence between variables. The present embodiment is also based on these assumptions.

The output section 54 corresponds to the output section 27 of FIG. 2. The output section 54 outputs the results of an independence test as a graphical model under control by the control section 52.

In FIG. 3, the control section 52 includes a categorical variable detection section 71, a categorical variable test execution section 72, a numerical variable test execution section 73, a categorical variable selection section 74, a discretization section 75, and an execution determination section 76. The storage section 53 includes a variable pair storage section 81, a categorical variable storage section 82, and a discrete data storage section 83.

The categorical variable detection section 71 detects a categorical variable, which is a discrete value, from an input variable set. As the variable which can be included in the input variable set, there is not only the categorical variable but also a numerical variable which is a continuous value.

The categorical variable test execution section 72 executes the independence test on the two variables when both of the two variables focused upon are categorical variables.

The numerical variable test execution section 73 executes the independence test on the two variables when both of the two variables focused upon are numerical variables.

The categorical variable selection section 74 selects one categorical variable from the categorical variables stored in the categorical variable storage section 82.

The discretization section 75 discretizes the numerical variables (changes the numerical variables into the categorical variables) on the basis of the categorical variable which is selected by the categorical variable selection section 74, when the categorical variables and the numerical variables are mixed and included in the input variable set.

The execution determination section 76 determines whether or not independence is rejected in the independence test which is executed by the categorical variable test execution section 72. If it is determined that independence is rejected by the execution determination section 76, the categorical variable test execution section 72 terminates execution of the independence test.

The variable pair storage section 81 stores pairs of two variables which are dependent or which are not subjected to the independence test and are connected by edges.

The categorical variable storage section 82 stores all the categorical variables which are detected from the input variable set by the categorical variable detection section 71.

The discrete data storage section 83 temporarily stores the discrete data (discrete variables) in which the numerical variables are discretized by the discretization section 75.

Principle of Cause-Effect Relationship Estimation Process

Next, referring to the flowchart of FIG. 4, a principle of the cause-effect relationship estimation process executed by the information processing apparatus 11 will be described.

In the cause-effect relationship estimation process of FIG. 4, the independence test process is performed by using a predetermined number of conditional variable sets Z (hereinafter simply referred to as conditional variables Z) relative to a pair of variables which are stored in the variable pair storage section 81 and are formed of a pair of predetermined variables X and Y (connected by an edge).

First, in step S11, the control section 52 determines whether or not all the variables included in the variables X and Y and the conditional variables Z are categorical variables on the basis of the number of categorical variables detected from the variables X and Y and the conditional variables Z by the categorical variable detection section 71. At this time, all the categorical variables, which are detected by the categorical variable detection section 71, are stored in the categorical variable storage section 82.

In step S11, if it is determined that all the variables X and Y and the conditional variables Z are categorical variables, the process advances to step S12, and the control section 52 executes an independence test process 1 on the variables X and Y which are categorical variables.

Figure 5:
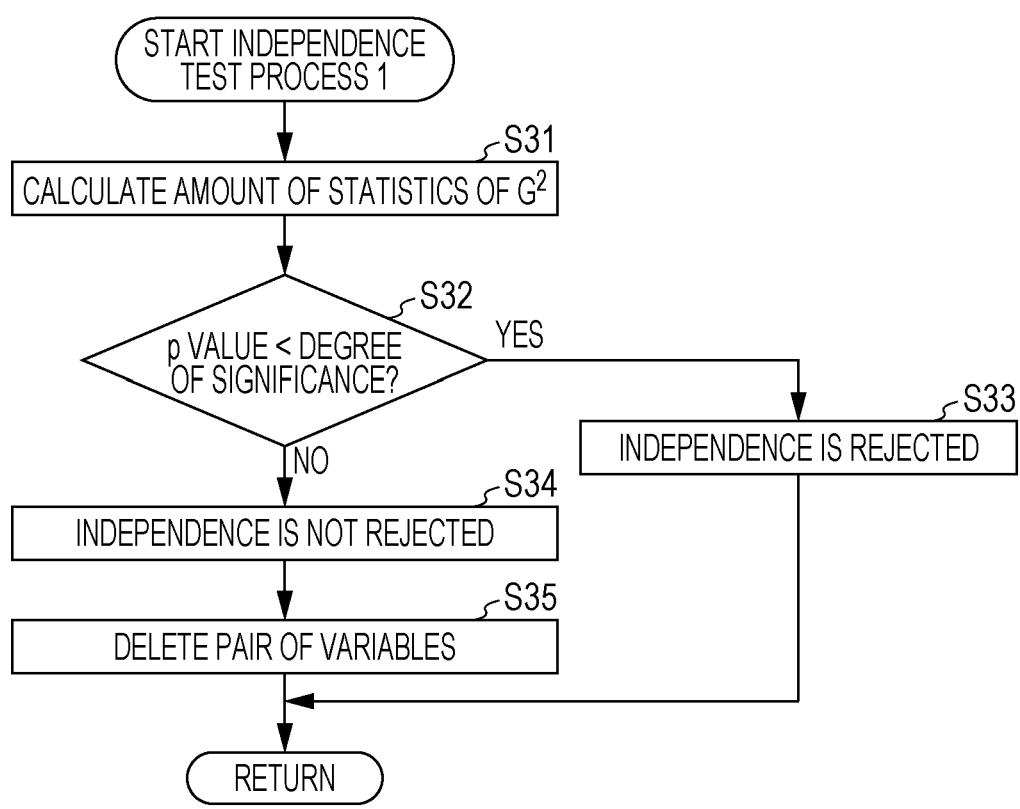
FIG. 5 is a flowchart illustrating an independence test process 1.

Here, referring to the flowchart of FIG. 5, the independence test process 1 executed by the control section 52 will be described in detail.

In step S31, the categorical variable test execution section 72 calculates a statistical amount of $G^2$ which is a value used to execute the independence test. The statistical amount of $G^2$ is represented by the following expression (1).

$$G^2 = 2M \sum_{x,y,z} \hat{P}(x, y, z) \log \frac{\hat{P}(x \mid y, z)}{\hat{P}(x \mid z)} \quad (1)$$

In Expression (1), M indicates the number of data pieces. Further, P(x, y, z) having ^ (hat) attached thereto (hereinafter referred to as hat P(x, y, z)) indicates an estimated joint probability of the certain states x, y, and z for the variables X and Y and the set of conditional variables Z. The hat P(x|y, z) indicates an estimated conditional probability of the state x in a case of setting the states y and z as conditions. The hat P(x|z) indicates an estimated conditional probability of the state x in a case of setting the state z as a condition. Those are estimated using M data pieces.

Here, the test for independence between the two variables is performed by comparing the p value as an indicator of the independence test and the degree of significance Th (for example, 5% (0.05)) derived by using the above-mentioned statistical amount of $G^2$ and distribution of $\chi^2$.

That is, in step S32, the categorical variable test execution section 72 determines whether or not the p value is less than the degree of significance Th.

In step S32, if it is determined that the p value is less than the degree of significance Th, the process advances to step S33, and the categorical variable test execution section 72 rejects independence between the variables X and Y.

In contrast, in step S32, if it is determined that the p value is not less than the degree of significance Th, the process advances to step S34, and the categorical variable test execution section 72 does not reject the independence between the variables X and Y.

Then, in step S35, the categorical variable test execution section 72 deletes the edge of the pair of variables formed of the variables X and Y, thereby deleting the pair of variables from the variable pair storage section 81.

In addition, in the above description, as the indicator of the independence test, the p value is used. However, a conditional mutual information amount MI represented by the following Expression (2) may be used as the indicator of the independence test.

$$MI = \frac{G^2}{2M} \quad (2)$$

In this case, if it is determined that the conditional mutual information amount MI is less than a threshold value by comparing the conditional mutual information amount MI and the predetermined threshold value (for example, 0.05), the independence between the variables X and Y is not rejected.

As described above, in the independence test process 1, the test for independence between the variables X and Y which are the categorical variables is executed.

Figure 4:
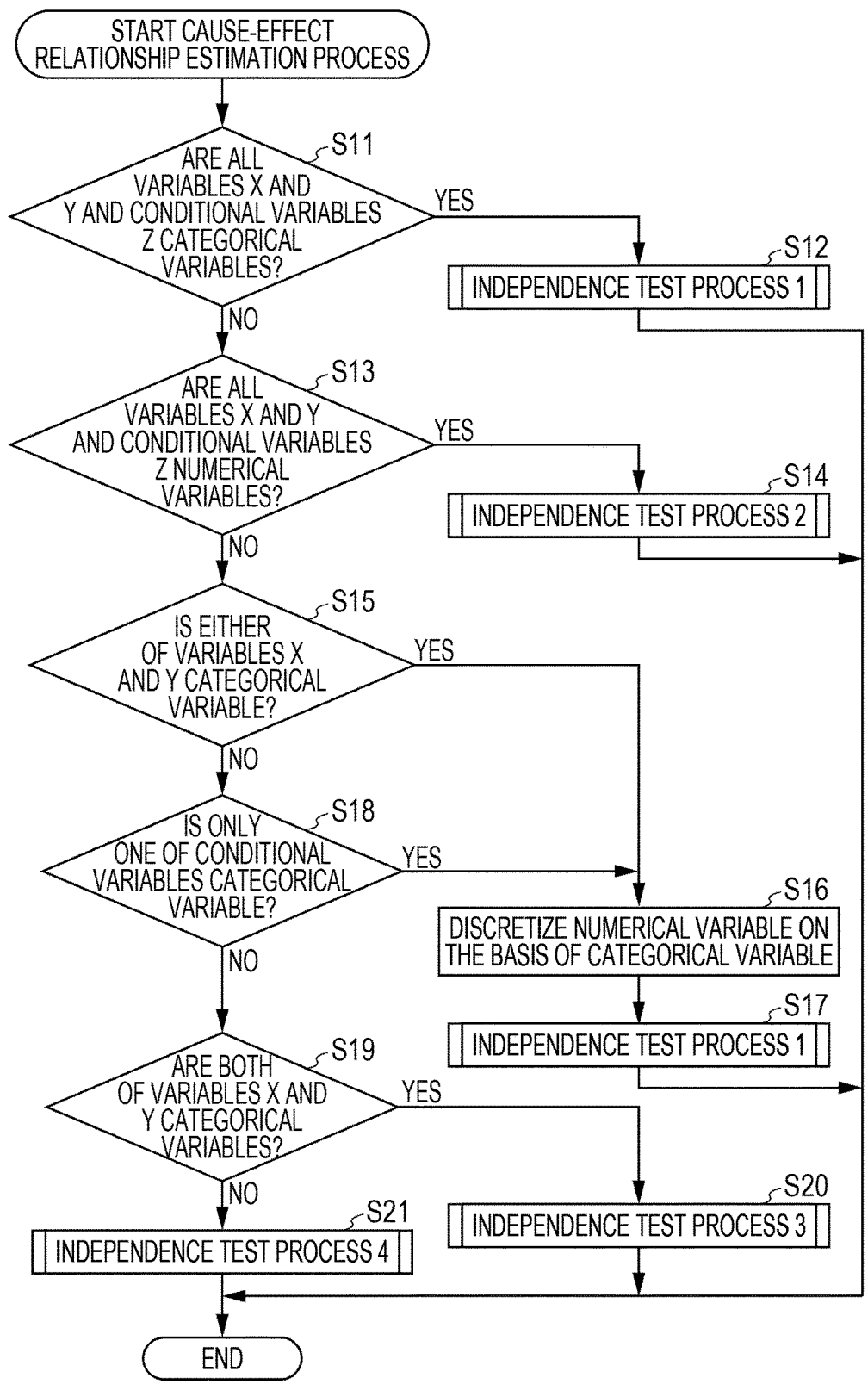
FIG. 4 is a flowchart illustrating a principle of a cause-effect relationship estimation process.

Returning to the flowchart of FIG. 4, in step S11, if it is determined that all the variables X and Y and the conditional variables Z are not the categorical variables, the process advances to step S13, and the control section 52 determines whether or not all the variables included in the variables X and Y and the conditional variables Z are the numerical variables.

In step S13, if it is determined that all the variables X and Y and the conditional variables Z are the numerical variables, the process advances to step S14, and the control section 52 executes an independence test process 2 on the variables X and Y which are the numerical variables.

Figure 6:
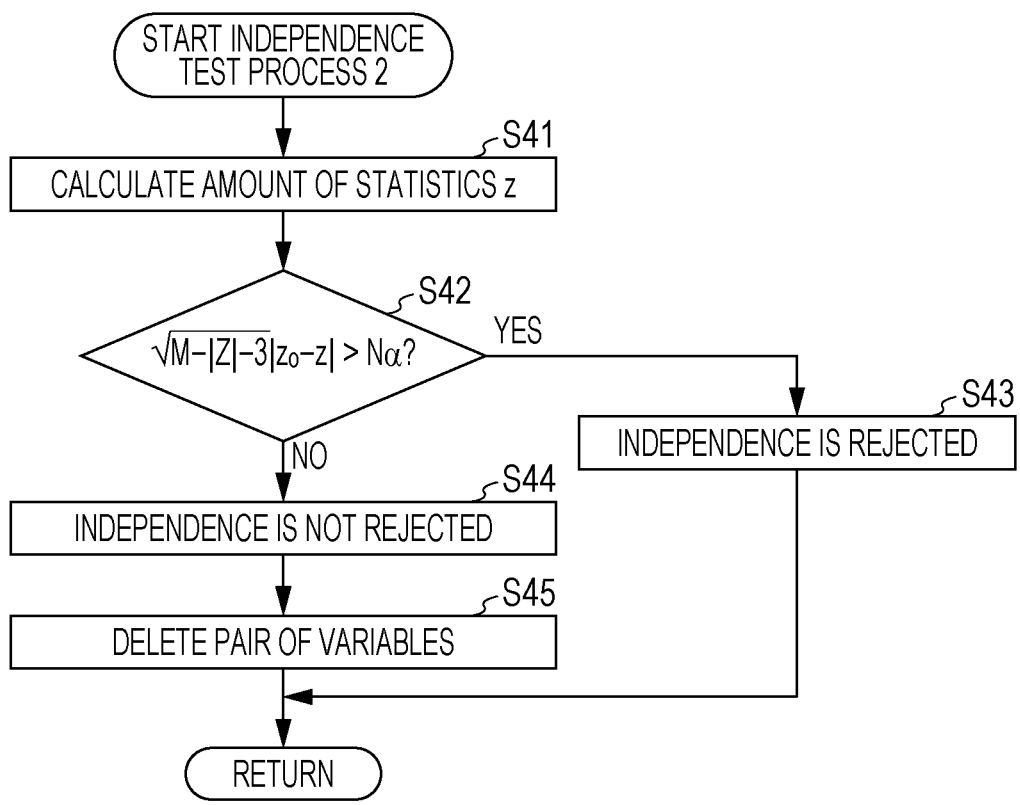
FIG. 6 is a flowchart illustrating an independence test process 2.

Here, referring to the flowchart of FIG. 6, the independence test process 2 executed by the control section 52 will be described in detail.

In step S41, the numerical variable test execution section 73 assumes a linear correlation, thereby calculating the statistical amount z which is a value used to execute the independence test through the Fisher's Z conversion. The statistical amount z is represented by the following Expression (3).

$$z = \frac{1}{2}\sqrt{M - |Z| - 3} \log\left(\frac{1 + \rho_{XYZ}}{1 - \rho_{XYZ}}\right) \quad (3)$$

In Expression (3), M indicates the number of data pieces. Further, |z| indicates the number of variables constituting the set of conditional variables Z, and $\rho_{XYZ}$ indicates a coefficient of a partial correlation between the variables X and Y in a case where it is assumed that no conditional independence is established for the set of conditional variables Z.

Here, the test for independence between the two variables is performed by using the constant $N_\alpha$ determined by the degree of significance and the standard normal distribution and the statistical amount $z_0$ using the coefficient of the partial correlation between the variables X and Y in a case where it is assumed that conditional independence is established.

That is, in step S42, the numerical variable test execution section 73 determines whether or not the following Expression (4) is established.

$$\sqrt{M - |Z| - 3}|z - z_0| > N_\alpha \quad (4)$$

In step S42, if it is determined that Expression (4) is established, the process advances to step S43, and the numerical variable test execution section 73 rejects the independence between the variables X and Y.

In contrast, in step S42, if it is determined that Expression (4) is not established, the process advances to step S44, and the numerical variable test execution section 73 does not reject the independence between the variables X and Y.

Then, in step S45, the numerical variable test execution section 73 deletes the edge of the pair of variables formed of the variables X and Y, and deletes the pair of variables from the variable pair storage section 81.

As described above, in the independence test process 2, the test for independence between the variables X and Y which are numerical variables is executed.

Returning to the flowchart of FIG. 4, in step S13, if it is determined that all the variables X and Y and the conditional variables Z are not the numerical variables, the process advances to step S15, and the control section 52 determines whether or not one of the variables X and Y is a categorical variable. At this time, it is not considered whether the variables constituting the conditional variables Z are categorical variables or numerical variables.

In step S15, if it is determined that one of the variables X and Y is the categorical variable, the categorical variable selection section 74 acquires the variable X (or variable Y) which is the categorical variable stored in the categorical variable storage section 82, and the process advances to step S16.

In step S16, the discretization section 75 discretizes the variable Y (or variable X), which is a numerical variable, and a numerical variable if the numerical value is included in the conditional variables Z, on the basis of the variable X (or variable Y) which is the categorical variable acquired by the categorical variable selection section 74. The discrete data, in which the numerical variables are discretized, are temporarily held in the discrete data storage section 83. It should be noted that, as a technique of discretizing numerical variables on the basis of a categorical variable, for example, the technique disclosed in "Multi-Interval Discretization of Continuous-Valued Attributions for Classification Learning" is applied, but another method may be applied.

At this time, all the variables X and Y and the conditional variables Z can be regarded as categorical variables.

Then, in step S17, the control section 52 executes the independence test process 1, which was described with reference to the flowchart of FIG. 6, on the variables X and Y which are categorical variables.

In contrast, in step S15, if it is determined that one of the variables X and Y is not a categorical variable, that is, if both of the variables X and Y are categorical variables or numerical variables, the process advances to step S18.

In step S18, the control section 52 determines whether or not only one of the variables constituting the conditional variables Z is a categorical variable.

In step S18, if it is determined that only one of the variables constituting the conditional variables Z is a categorical variable, the categorical variable selection section 74 acquires the categorical variable which is stored in the categorical variable storage section 82 and constitutes the conditional variables Z, and the process of steps S16 and S17 is executed.

In step S16 after step S18, the variables X and Y, which are numerical variables, are discretized together with other numerical variables constituting the conditional variables Z, on the basis of the categorical variable acquired by the categorical variable selection section 74. Then, in step S17, the independence test process 1 is executed on the variables X and Y which are the discretized categorical variables.

However, in step S18, if it is determined that only one of the variables constituting the conditional variables Z is not a categorical variable, the process advances to step S19, and the control section 52 determines whether or not both of the variables X and Y are categorical variables. At this time, it is not considered whether the variables constituting the conditional variables Z are categorical variables or numerical variables.

In step S19, if it is determined that both of the variables X and Y are categorical variables, the categorical variable selection section 74 acquires the variables X and Y which are stored in the categorical variable storage section 82 and are categorical variables, and the process advances to step S20. In this case, the conditional variables Z include at least one numerical variable.

In step S20, the control section 52 executes an independence test process 3 on the variables X and Y which are categorical variables.

Figure 7:
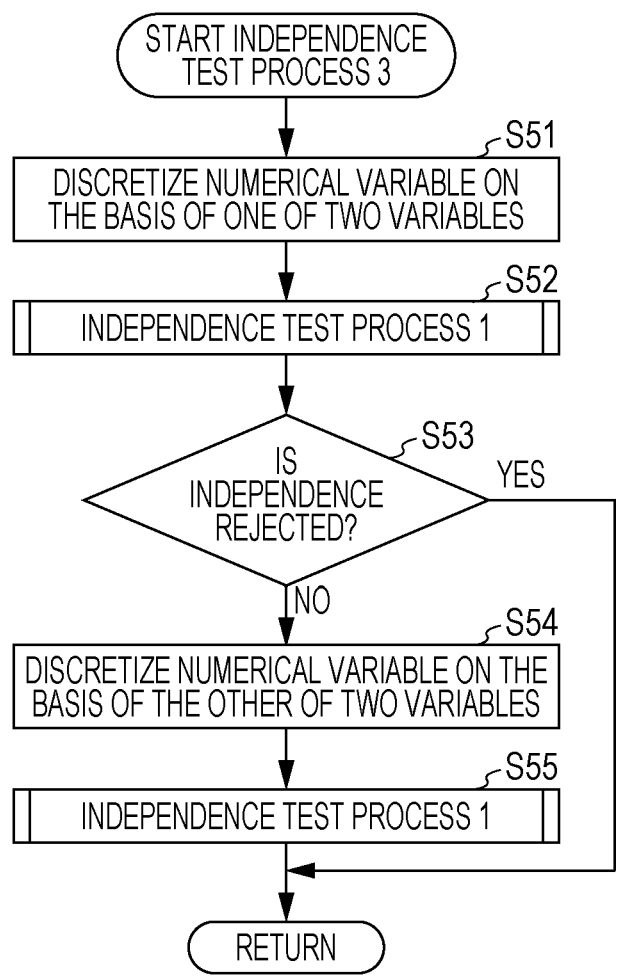
FIG. 7 is a flowchart illustrating an independence test process 3.

Here, referring to the flowchart of FIG. 7, the independence test process 3 executed by the control section 52 will be described in detail.

In step S51, the discretization section 75 discretizes at least one numerical variable, which is included in the conditional variables Z, on the basis of one (for example, the variable X) of the two variables (variables X and Y) which are the categorical variables acquired by the categorical variable selection section 74. The discrete data, in which the numerical variables are discretized, are temporarily held in the discrete data storage section 83.

At this time, all the variables X and Y and the conditional variables Z can be regarded as categorical variables.

In step S52, the categorical variable test execution section 72 executes the independence test process 1 on the variables X and Y which are categorical variables.

In step S53, the execution determination section 76 determines whether or not independence is rejected, in the independence test process 1 of step S52.

In step S53, if it is determined that the independence is not rejected, that is, in the independence test process 1 of step S52, if it is determined that there is independence between the variables X and Y, the process advances to step S54.

In step S54, the discretization section 75 discretizes at least one numerical variable, which is included in the conditional variables Z, on the basis of the other (for example, the variable Y) of the two variables (variables X and Y) which are the categorical variables acquired by the categorical variable selection section 74.

Then, in step S55, the categorical variable test execution section 72 executes the independence test process 1 again on the variables X and Y which are categorical variables.

In contrast, in step S54, if it is determined that independence is rejected, that is, in the independence test process 1 of step S52, if it is determined that there is dependence between the variables X and Y, the test for independence between the variables X and Y is not executed any more, and the process returns to step S20.

As described above, in the independence test process 3, the numerical variable is discretized on the basis of each of a plurality of categorical variables, that is, the variables X and Y, thereby executing the independence test. In the process, the execution determination section 76 determines whether or not independence is rejected in a certain independence test, and if it is determined that independence is rejected, execution of the independence test using the categorical variable test execution section 72 ends.

Returning to the flowchart of FIG. 4, in step S19, if it is determined that both of the variables X and Y are not categorical variables, that is, if both of the variables X and Y are numerical variables, the conditional variables Z include at least two categorical variables. In this case, the categorical variable selection section 74 acquires the categorical variables which are stored in the categorical variable storage section 82, and the process advances to step S21.

In step S21, the control section 52 executes an independence test process 4 on the variables X and Y, which are numerical variables.

Figure 8:
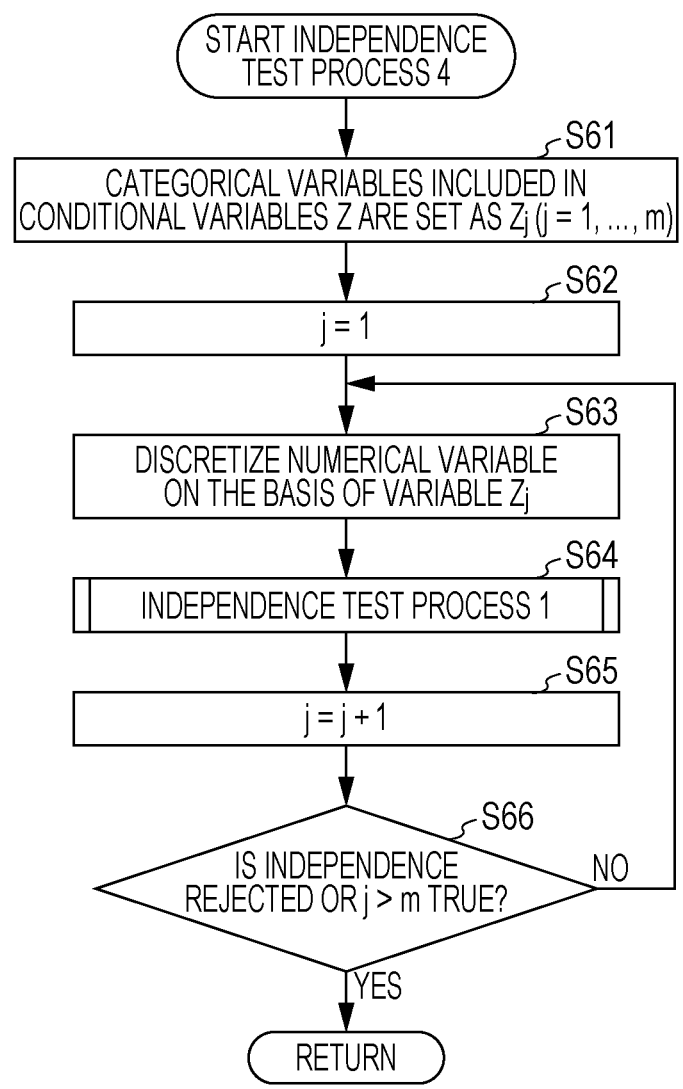
FIG. 8 is a flowchart illustrating an independence test process 4.

Here, referring to the flowchart of FIG. 8, the independence test process 4 executed by the control section 52 will be described in detail.

In step S61, the control section 52 sets at least two categorical variables, which are acquired by the categorical variable selection section 74 and are included in the conditional variables Z, as $Z_j$. It should be noted that the value j is in the range of 1 to m and m indicates the number of categorical variables included in the conditional variables Z.

In step S62, the control section 52 sets j to 1.

In step S63, the discretization section 75 discretizes the variables X and Y and other variables (numerical variables) included in the conditional variables Z, on the basis of the categorical variable $Z_j$ (here, $Z_1$) included in the conditional variables Z acquired by the categorical variable selection section 74. The discrete data, in which the numerical variables are discretized, are temporarily held in the discrete data storage section 83.

At this time, all the variables X and Y and the conditional variables Z can be regarded as categorical variables.

In step S64, the categorical variable test execution section 72 executes the independence test process 1 on the variables X and Y which are categorical variables.

In step S65, the control section 52 increments the value j by 1.

Then, in step S66, the execution determination section 76 determines whether independence is rejected or whether or not j>m in the independence test process 1 of step S64.

In step S66, if it is determined that independence is not rejected and j>m is not true, that is, in the independence test process 1 of step S64, if it is determined that there is independence between the variables X and Y, and if the independence test and discretization of the numerical variables based on all the categorical variables $Z_j$ have not been performed, the process returns to step S63, and the process of steps S63 to S65 is repeated.

In contrast, in step S66, if it is determined that independence is rejected or j>m is true, that is, in the independence test process 1 of step S64, if it is determined there is dependence between the variables X and Y, or, if the independence test and discretization of the numerical variables based on all the categorical variables $Z_j$ haven been performed, the process returns to step S21.

As described above, in the independence test process 4, the numerical variable is discretized on the basis of each of a plurality of categorical variables, that is, the categorical variables $Z_j$, thereby executing the independence test. In the process, the execution determination section 76 determines whether or not independence is rejected in a certain independence test, and if it is determined that independence is rejected, execution of the independence test using the categorical variable test execution section 72 ends.

As described above, for the predetermined variables X and Y on which the independence test is executed, if independence is rejected, a graphical model, in which the pair of variables is connected by an edge, is output as an image to a monitor or the like as the output section 54. Here, the output graphical model is a graph in which the edge connecting the pair of variables is partially directed and the direction of the cause-effect relationship is partially estimated on the basis of information indicating which conditional variable conditional independence is not rejected by.

According to the above-mentioned process, when the variables X and Y and the conditional variables Z include at least one categorical variable and at least one numerical variable, the numerical variable is discretized on the basis of the categorical variable, and the test for conditional independence between the variables X and Y is executed by using the discretized discrete variable and the categorical variable. Consequently, even when the categorical variable and the numerical variable are mixed in the multiple variables, it is possible to estimate the cause-effect relationship between multiple variables.

In the above description, focusing on only the predetermined variables X and Y and set of conditional variables Z, the principle of the cause-effect relationship estimation process has been described. However, in practice, focusing on all the variables included in the input variable set, it is necessary to perform the cause-effect relationship estimation process.

Specific Example of Cause-Effect Relationship Estimation Process

Referring to the flowchart of FIGS. 9 to 11, a specific example of the cause-effect relationship estimation process will be described. The storage section 53 stores, in advance, the number of variables N and the number of inside states equal to or greater than 2 which can be obtained from each variable. Thus, when M data pieces in which states for all the variables are described are input by the input section 51, the independence test process is started.

In addition, in an initial state, the variable pair storage section 81 stores pairs of variables in which N variables and different (N−1) variables are respectively set as pairs (connected by edges), and the categorical variable storage section 82 and the discrete data storage section 83 store no data.

In step S111, the control section 52 sets the number i of sets of condition variables to 0, that is, makes the set of conditional variables be an empty set.

In step S112, the control section 52 selects one pair of variables from the pairs of variables stored in the variable pair storage section 81.

In step S113, the control section 52 determines whether or not both of the two variables of the pair of variables are categorical variables.

In step S113, if it is determined that both of the two variables are categorical variables, the process advances to step S114, and the independence test process 1 is executed. In contrast, if it is determined that both of the two variables are not categorical variables, the process advances to step S115.

In step S115, the control section 52 determines whether or not both of the two variables are numerical variables.

In step S115, if it is determined that both of the two variables are numerical variables, the process advances to step S116, and the independence test process 2 is executed. In contrast, if it is determined that both of the two variables are not numerical variables, the process advances to step S117.

In this case, any one of the two variables is a categorical variable, and the other is a numerical variable.

In step S117, on the basis of one of the two variables which is a categorical variable, the discretization section 75 discretizes the other of the two variables which is a numerical variable. Thereafter, in step S118, the independence test process 1 is executed.

After step S114, S116, or S118, in step S119, the control section 52 determines whether or not the process of steps S112 to S118 has been executed, that is, a test for unconditional independence has been executed, on all the pairs of variables stored in the variable pair storage section 81.

In step S119, if it is determined that all the pairs of variables have not been processed, the process returns to step S112, and the process of steps S112 to S118 is repeated on newly selected pairs of variables.

Figure 10:
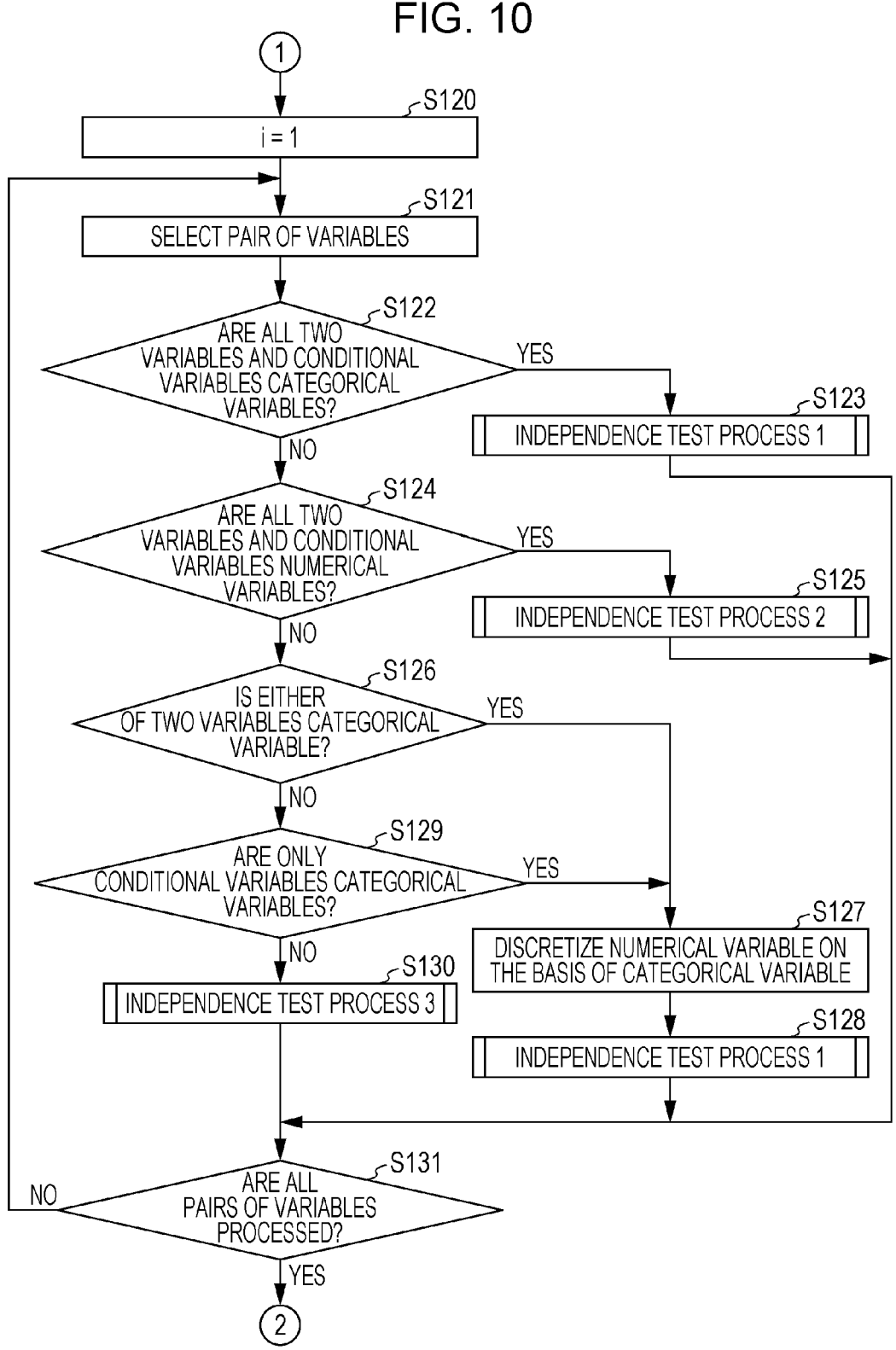
FIG. 10 is a flowchart illustrating the specific example of the cause-effect relationship estimation process.

In contrast, in step S119, if it is determined that all the pairs of variables have been processed, the process advances to step S120 (FIG. 10). At this time, the variable pair storage section 81 stores only the pairs of two variables between which independence is rejected (two variables which are dependent).

In step S120, the control section 52 sets the number i of the sets of conditional variables to 1.

In step S121, the control section 52 selects one pair of variables from the pairs of variables stored in the variable pair storage section 81, that is, the pairs of two variables which are dependent.

In step S122, the control section 52 determines whether or not all the two variables and the conditional variables are categorical variables.

In step S122, if it is determined that all the two variables and the conditional variables are categorical variables, the process advances to step S123, and the independence test process 1 is executed. In contrast, if it is determined that both of the two variables are not categorical variables, the process advances to step S124.

In step S124, the control section 52 determines whether or not all the two variables and the conditional variables are numerical variables.

In step S124, if it is determined that all the two variables and the conditional variables are numerical variables, the process advances to step S125, and the independence test process 2 is executed. In contrast, if it is determined all the two variables and the conditional variables are not numerical variables, the process advances to step S126.

In step S126, the control section 52 determines whether or not one of the two variables is a categorical variable. At this time, it is not considered whether the conditional variables are categorical variables or numerical variables.

In step S126, if it is determined that one of the two variables is a categorical variable, the process advances to step S127. Then, on the basis of one of the two variables which is a categorical variable, the discretization section 75 discretizes the other of the two variables, which is a numerical variable, and the conditional variables if the conditional variables are numerical variables. Then, in step S128, the independence test process 1 is executed.

In contrast, in step S126, if it is determined that one of the two variables is not a categorical variable, that is, if both of the two variables are categorical variables or numerical variables, the process advances to step S129, and the control section 52 determines whether or not only the conditional variables are categorical variables.

In step S129, if it is determined that only the conditional variables are categorical variables, the process advances to step S127, and the process of S127 and S128 is executed in a state where the conditional variables are set as criteria of discretization.

In contrast, in step S129, if it is determined that only the conditional variables are not categorical variables, that is, if both of the two variables are categorical variables and the conditional variables are numerical variables, the process advances to step S130, and the independence test process 3 is executed.

After step S123, S125, S128, or S130, in step S131, the control section 52 determines whether the process of steps S121 to S130, that is, the test for conditional independence, in which the number of the sets of conditional variables is set to 1, has been executed on all the pairs of variables stored in the variable pair storage section 81.

In step S131, if it is determined that all the pairs of variables have not been processed, the process returns to step S121, and the process of steps S121 to S130 is repeated on newly selected pairs of variables.

Figure 11:
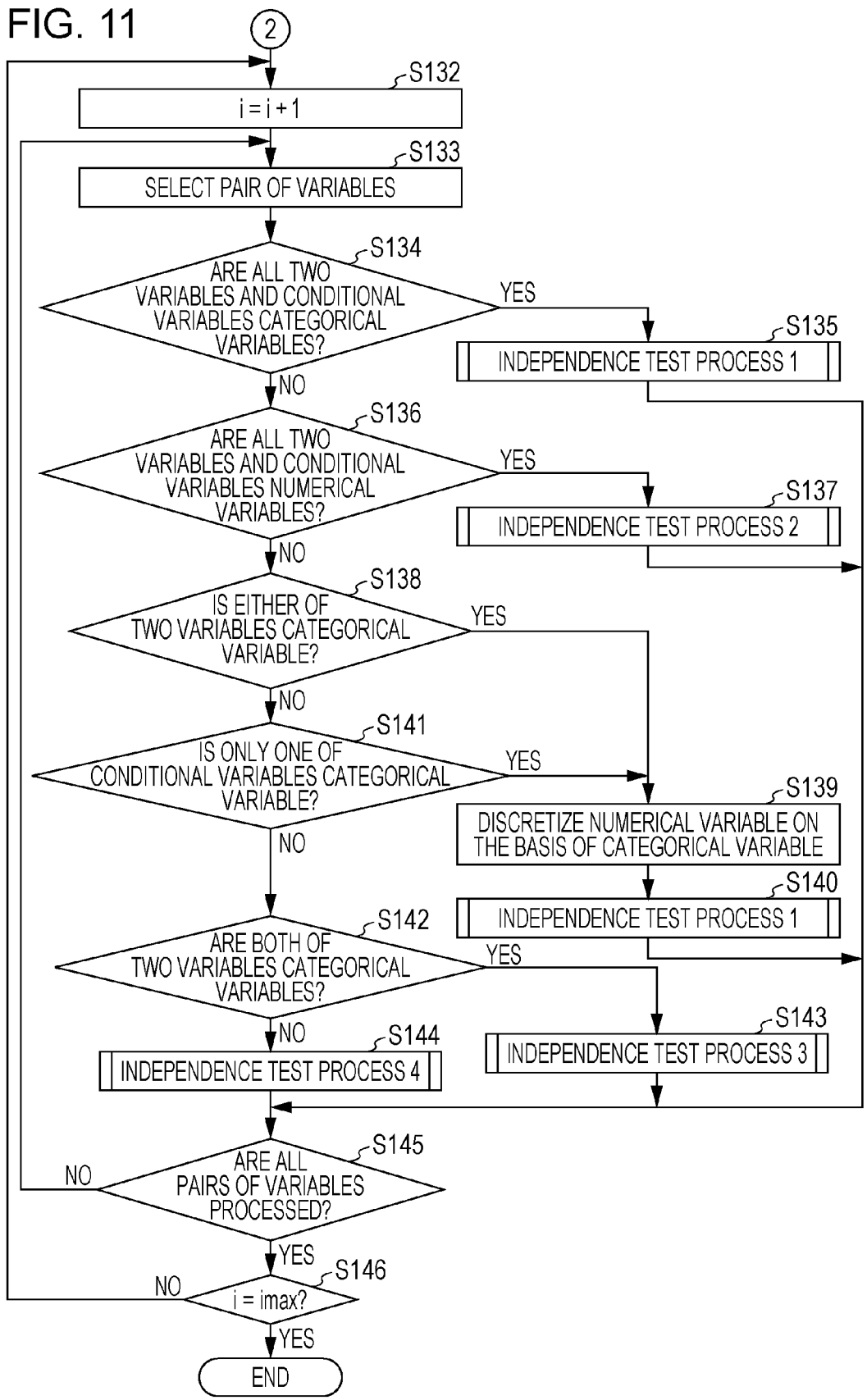
FIG. 11 is a flowchart illustrating the specific example of the cause-effect relationship estimation process.

In contrast, in step S131, if it is determined that all the pairs of variables have been processed, the process advances to step S132 (FIG. 11). At this time, the variable pair storage section 81 also stores only the pairs of two variables between which independence is rejected (two variables which are dependent).

In step S132, the control section 52 increments the number i of the sets of conditional variables by 1. That is, first, the number of the sets of conditional variables is set to 2.

In step S133, the control section 52 selects one pair of variables from the pairs of variables stored in the variable pair storage section 81, that is, the pairs of two variables which are dependent.

In step S134, the control section 52 determines whether or not all the two variables and the variables (in this case, two variables) constituting the conditional variables are categorical variables.

In step S134, if it is determined that all the two variables and the variables constituting the conditional variables are categorical variables, the process advances to step S135, and the independence test process 1 is executed. In contrast, if it is determined that all the two variables and the variables included in the conditional variables are not categorical variables, the process advances to step S136.

In step S136, the control section 52 determines whether or not all the two variables and the variables constituting the conditional variables are numerical variables.

In step S136, if it is determined that all the two variables and the variables constituting the conditional variables are numerical variables, the process advances to step S137, and the independence test process 2 is executed. In contrast, if it is determined all the two variables and the variables constituting the conditional variables are not numerical variables, the process advances to step S138.

In step S138, the control section 52 determines whether or not one of the two variables is a categorical variable. At this time, it is not considered whether the variables constituting the conditional variables are categorical variables or numerical variables.

In step S138, if it is determined that one of the two variables is a categorical variable, the process advances to step S139. Then, on the basis of one of the two variables which is a categorical variable, the discretization section 75 discretizes the other of the two variables, which is a numerical variable, and discretizes numerical variables if the conditional variables include the numerical variables. Then, in step S140, the independence test process 1 is executed.

In contrast, in step S138, if it is determined that one of the two variables is not a categorical variable, that is, if both of the two variables are categorical variables or numerical variables, the process advances to step S141, and the control section 52 determines whether or not only one of the variables constituting the conditional variables is a categorical variable.

In step S141, if it is determined that only one of the variables constituting the conditional variables is a categorical variable, the process advances to step S139, and the process of S139 and S140 is executed in a state where the categorical variable is set as a criterion of discretization.

In contrast, in step S141, if it is determined that only one of the variables constituting the conditional variables is not a categorical variable, the process advances to step S142, and the control section 52 determines whether or not both of the two variables are categorical variables.

In step S142, if it is determined that both of the two variables are categorical variables, the process advances to step S143, and the independence test process 3 is executed.

In contrast, in step S142, if it is determined that both of the two variables are not categorical variables, the process advances to step S144, and the independence test process 4 is executed.

After step S135, S137, S140, S143, or S144, in step S145, the control section 52 determines whether the process of steps S133 to S144, that is, the test for conditional independence, in which the number of the sets of conditional variables is set to 2, has been executed on all the pairs of variables stored in the variable pair storage section 81.

In step S145, if it is determined that all the pairs of variables have not been processed, the process returns to step S133, and the process of steps S133 to S144 is repeated on newly selected pairs of variables.

In contrast, in step S145, if it is determined that all the pairs of variables have been processed, the process advances to step S146. At this time, the variable pair storage section 81 also stores only the pairs of two variables between which independence is rejected (two variables which are dependent).

In step S146, the control section 52 determines whether or not the number i of the sets of conditional variables is the maximum number (the number of all the sets included in the variable sets) imax (i=imax). In addition, imax may be any one of the maximum number determined by a user in advance, the maximum number determined by a calculator in accordance with an estimation process time period, and the maximum number determined by a user in process of calculation.

In step S146, if it is determined that i=imax is not true, the process returns to step S132, the number i of the sets of conditional variables is incremented by 1, that is, the number of the sets of conditional variables is set to 3 or more, and then the subsequent process is performed.

Then, in step S146, if it is determined that i=imax is true, the process ends. In such a manner, when all executable tests end, pairs of two variables, for which it has been continuously determined that the variables are dependent in the tests, remain in the variable pair storage section 81.

In addition, the contents stored in the storage section 53 are output to the output section 54 under control by the control section 52. Here, as described above, the edge connecting the pair of variables is partially directed, on the basis of the information indicating which conditional variable conditional independence is not rejected by. Thereby, for example, the output is a directed (acyclic) cyclic graph formed of directed edges indicating the cause-effect relationship between variables, a partially directed (acyclic) cyclic graph in which directed edges indicating the cause-effect relationship and undirected edges indicating the dependence relationship are mixed, a mixed ancestral graph, or a partially ancestral graph.

However, in the independence test process 4 (FIG. 8), as the number of the sets of conditional variables increases, the process is more likely to be repeated. However, in the independence test process 4, there is a possibility that, among the conditional variables (categorical variables) which are criteria of discretization, as a result of independence test between another two variables, there is a variable which is not appropriate as a condition of conditional independence between the two focused variables. Consequently, it is useless to execute the independence test by using such a conditional variable, and thus the total calculation amount increases.

Therefore, the independence test process 4 may be executed after the independence test process is executed on, for example, all the pairs of variables.

Another Specific Example of Cause-Effect Relationship Estimation Process

Here, referring to the flowchart of FIG. 12, a description will be given of a cause-effect relationship estimation process in which the independence test process 4 is executed after the independence test process is executed on all the pairs of variables.

Figure 9:
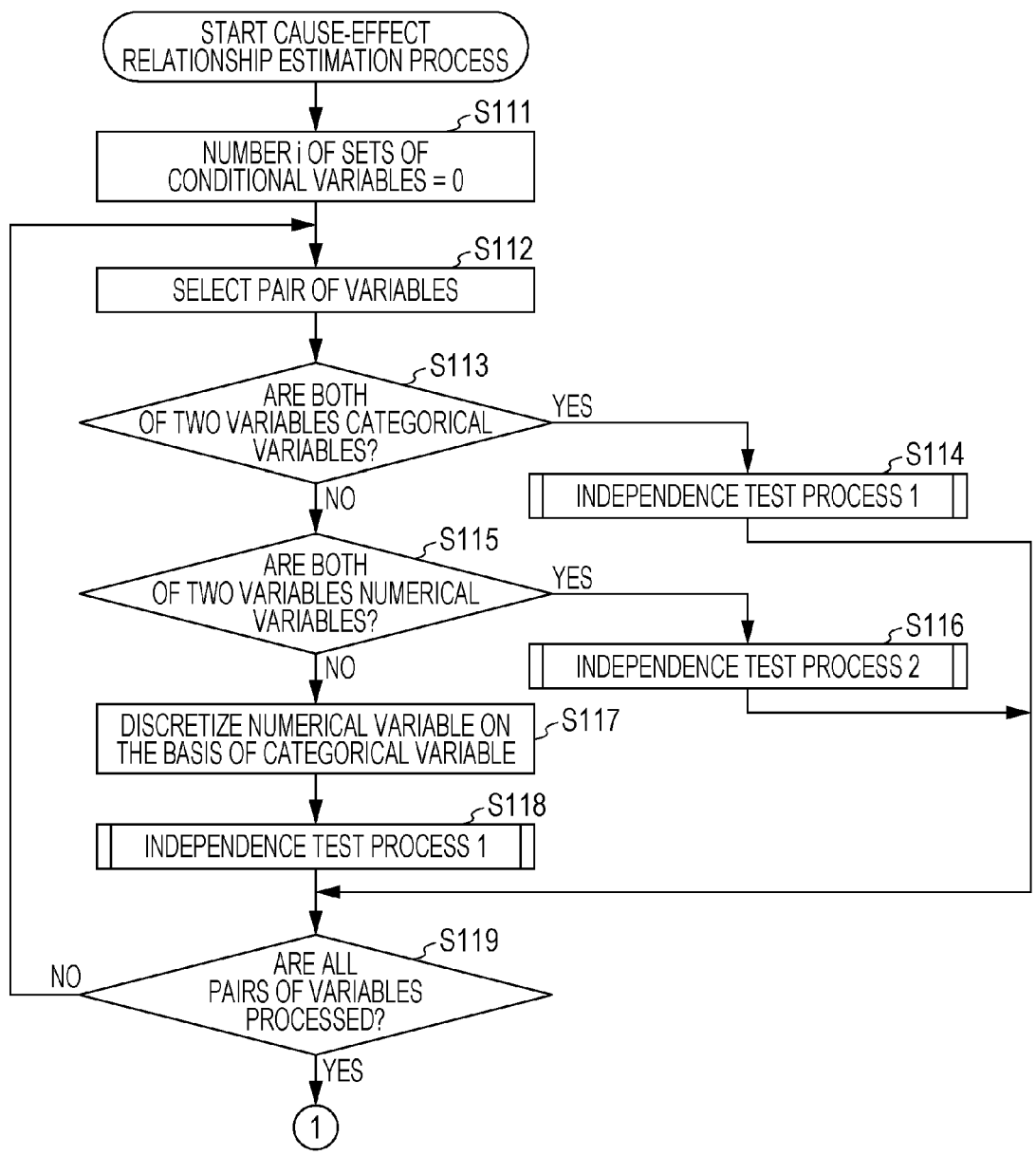
FIG. 9 is a flowchart illustrating a specific example of a cause-effect relationship estimation process.
Figure 12:
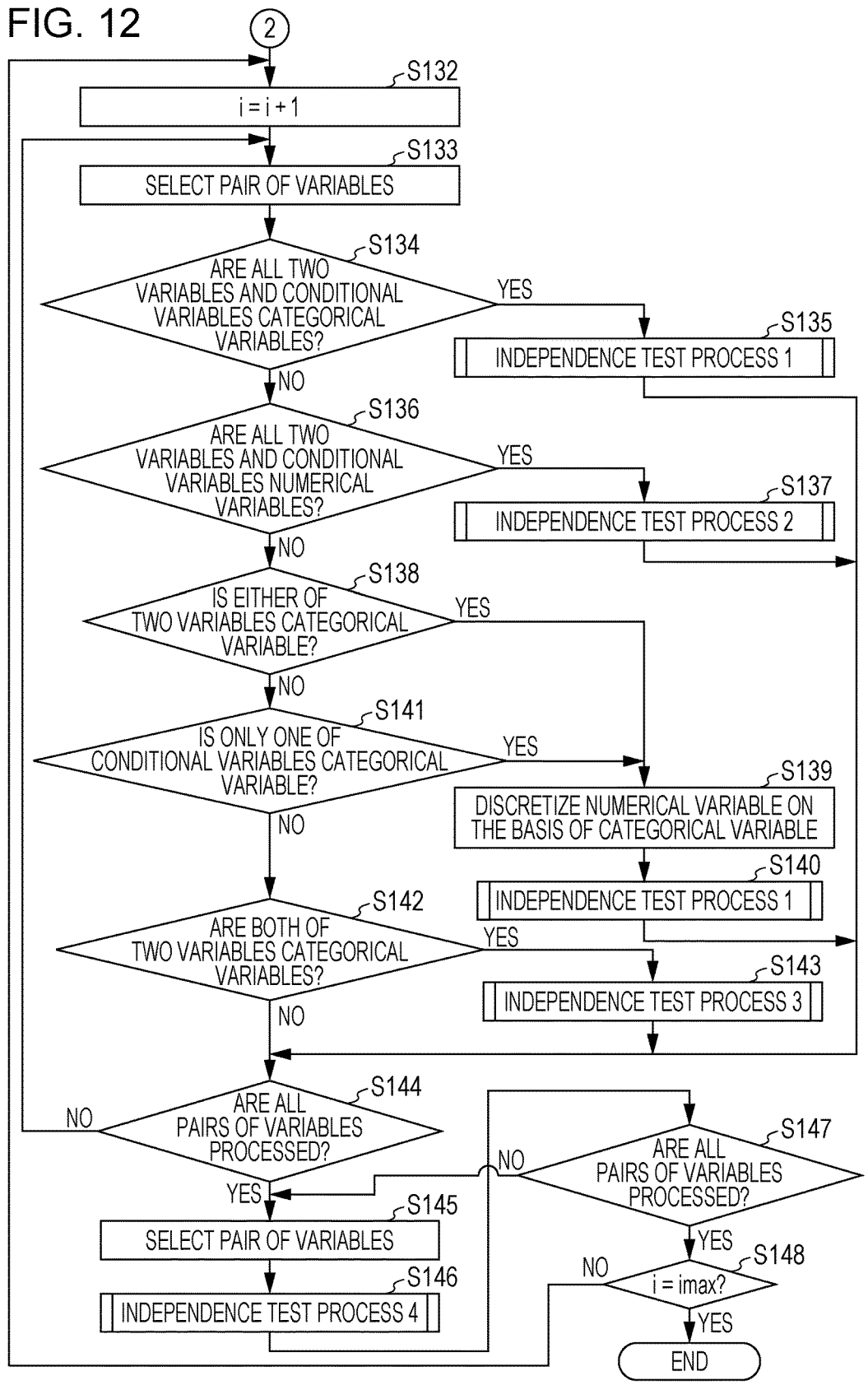
FIG. 12 is a flowchart illustrating another specific example of the cause-effect relationship estimation process.

In addition, the process to step S143 of the flowchart in FIG. 12 is the same as the process to step S143 of the flowchart in FIGS. 9 to 11, and the description thereof will be omitted.

That is, after step S135, S137, S140, or S143, or in step S142, if it is determined that both of the two variables are not categorical variables, the process advances to step S144.

In step S144, the control section 52 determines whether or not the process of steps S133 to S144 has been executed on all the pairs of variables stored in the variable pair storage section 81.

In step S144, if it is determined that all the pairs of variables have not been processed, the process returns to step S133, and the process of steps S133 to S143 is repeated on newly selected pairs of variables.

In contrast, in step S144, if it is determined that all the pairs of variables have been processed, the process advances to step S145.

In step S145, the control section 52 selects one pair of variables from the pairs of variables stored in the variable pair storage section 81. It should be noted that, as the pair of variables selected herein, only both of the two variables, which are numerical variables, are selected.

In step S146, the control section 52 executes the independence test process 4.

In step S147, the control section 52 determines whether or not the process of step S146, that is, the independence test process 4 has been executed on all the pairs of variables (pair of variables in which both of the two variables are numerical variables) stored in the variable pair storage section 81.

In step S147, if it is determined that all the pairs of variables have not been processed, the process returns to step S145, and the process of step S146 is repeated on newly selected pairs of variables.

In contrast, in step S147, if it is determined that all the pairs of variables have been processed, the process advances to step S148. It should be noted that the process of step S148 is the same as the process of step S146 of FIG. 11, and the description thereof will be omitted.

According to the above-mentioned process, the independence test process 4 is executed after the independence test process is executed on all the pairs of variables. Thus, no unnecessary process is executed in the independence test process 4, and it is possible to reduce the total calculation amount.

In the above description, after the independence test process is executed on all the pairs of variables, the independence test process 4 is executed. However, after the independence test process is executed on pairs of variables of which the number is equal to or greater than a predetermined number, the independence test process 4 may be executed. In this case, it is possible to obtain the same effect mentioned above.

Further, the timing, at which the independence test process 4 is executed, is not limited to the timing shown in the flowchart of FIG. 12, and may be, at least, subsequent to execution of the independence test process 3.

In addition, also in the independence test process 3, the independence test for the two variables focused upon is likely to be repeated at most twice. Consequently, also in the independence test process 3, for example, after the independence test process is executed on all the pairs of variables, the independence test process 3 may be executed.

In the above description, in the information processing apparatus 11, the cause-effect relationship estimation process is executed. However, the cause-effect relationship estimation process may be executed between apparatuses connected through a network.

Configuration Example of Network System

Figure 13:
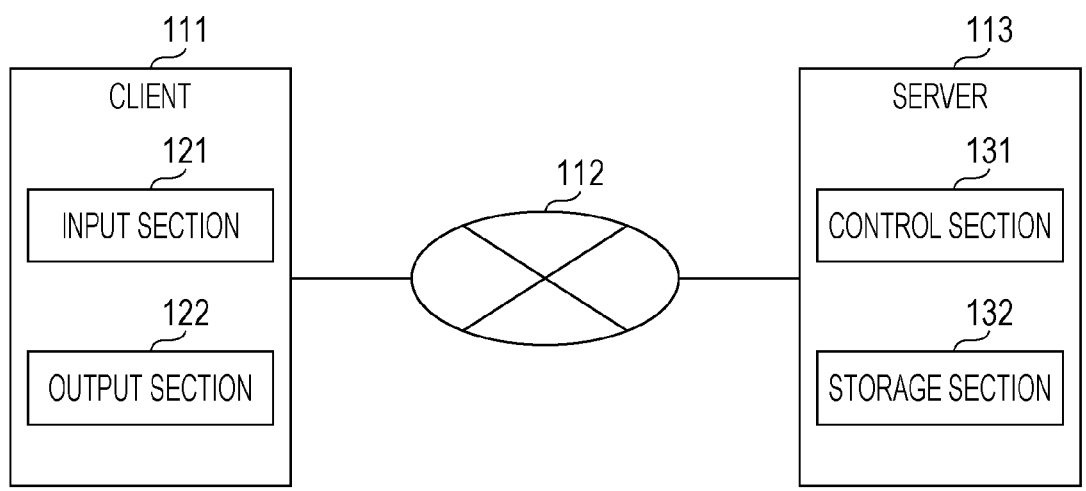
FIG. 13 is a block diagram illustrating a functional configuration example of a network system according to an embodiment of the present technology.

FIG. 13 shows a configuration example of a network system according to an embodiment of the present technology.

The network system shown in FIG. 13 includes a client 111 such as a mobile terminal operated by a user, and a server 113 that is connected through a network 112 such as the Internet.

The client 111 includes an input section 121 and an output section 122 respectively corresponding to the input section 51 and the output section 54 of FIG. 3.

Further, the server 113 includes a control section 131 and a storage section 132 respectively corresponding to the control section 52 and the storage section 53 of FIG. 3.

In such a configuration, the server 113 is able to execute the cause-effect relationship estimation process in response to an instruction from the client 111 and to output a result to the client 111.

Application Examples of the Present Technology

It should be noted that the present technology can be applied to the following examples:

(1) Cause-Effect Structure Discovery Program

The cause-effect relationship estimation process according to an embodiment of the present technology is applied to a cause-effect structure discovery program that discovers a statistical cause-effect structure between multiple variables. It should be noted that multivariate random variables in which categorical variables and numerical variables are mixed are defined by a user and a data set may also be provided in advance. By inputting such data, when the test for conditional independence is performed in the above-mentioned cause-effect relationship estimation process, numerical variables are discretized as necessary, and thereby the independence test is performed.

Here, in a similar manner to the independence test process 4, in a case where there are multiple categorical variables which are criteria of discretization, it takes time to calculate discretization. Hence, there may be provided a function of causing a user to designate a categorical variable which is a criterion of discretization in advance. In this case, discretization and independence tests are performed on the basis of only the categorical variable designated by the user, and thus it is possible to reduce the calculation amount. After all the tests end, directing is performed on the basis of a rule of directing, and then a graphical model, which indicates a cause-effect structure having mixed directed edges and undirected edges, is output as an image to a monitor or the like as the output section 54. At this time, the graphical model may be output as text data, which indicates an equivalent relationship, to the monitor or the like. Thereby, a user is able to discover and check the cause-effect relationship or the dependence relationship between variables.

(2) Data Analysis in Factory

The cause-effect relationship estimation process according to an embodiment of the present technology is applied to a system that discovers the cause-effect relationship between various measurement items and yields in a factory. It should be noted that, as random variables, the following items are defined: whether or not a product is a non-defective product Y; a temperature in the factory T; a humidity in the factory M; a measurement item 1A; a measurement item 2B; an apparatus 1D; and an apparatus 2E. Here, the variable Y is a categorical variable that has two values indicating whether the manufactured product is a non-defective product or a defective product. The variable D is a variable for a manufacturing apparatus manufacturing a product and a categorical variable that has a model number of three types. The variable E is also a categorical variable that has a model number of two types. All the other variables are numerical variables, and variables that indicate numerical values relating to a product and an environment in which the product is manufactured.

When the number of the sets of conditional variables is 0, for example, in the test for independence between variables A and B, both of the variables A and B are numerical variables. Thus, discretization is not performed, and the independence test process 2 is executed. In the test for independence between variables D and E, both of the variables D and E are categorical variables. Therefore, the independence test process 1 is executed. In the test for independence between variables D and M, the variable D is a categorical variable, and the variable M is a numerical variable. Therefore, on the basis of the variable D, the variable M is discretized, and the independence test process 1 is executed.

When the number of the sets of conditional variables is 1, for example, in the test for conditional independence between the variables Y and M in a case where the variable A is set as a conditional variable, the variable Y is a categorical variable, and the variables A and M are numerical variables. Thus, on the basis of the variable Y, the variables A and M are discretized, and the independence test process 1 is executed. In the test for conditional independence between the variables Y and D in a case where the variable A is set as a conditional variable, the variables Y and D are categorical variables, and the variable A is a numerical variable. Thus, first, on the basis of the variable Y, the variable A is discretized, and the independence test process 1 is executed. When independence is not rejected, on the basis of the variable D, the variable A is discretized, and the independence test process 1 is executed again.

In such a manner, by estimating a graph structure called a V-shaped structure in addition to repetition of the independence test and applying the directing rule, the graphical model, in which the directed edges and the undirected edges are mixed, is output as an image to a monitor or the like as the output section 54. The V-shaped structure is, for example, a graph structure in which the variables X and Y are independent, and the variables X and Z are dependent, and the variables Y and Z are dependent. In this example, for example, {T-M}, {M→A}, {D→A}, {A→Y}, {B→Y}, {B-E}, or the like is output as the cause-effect relationship between variables. It should be noted that, here, the sign "-" between the variables indicates an undirected edge, and the sign "→" indicates a directed edge.

(3) Health Examination System

The cause-effect relationship estimation process according to the embodiment of the present technology is applied to a health examination system that discovers the statistical cause-effect structure between data, which can be obtained by health examination, and a status of an internal organ of a subject. It should be noted that, among the random variables, as numerical variables, the following are defined: an age A; a BMI (Body Mass Index) B; a blood pressure C; an uric acid level D; a body fat percentage E; a blood glucose level F; and an overtime G, and as categorical variables, the following are defined: a gender S; a job type J; and a job position P. The variable S is a categorical variable that has two values corresponding to a male and a female. The variable J is a variable for the job type, and is a categorical variable by which, for example, business, research, development, human resources, or the like is defined in advance.

The variable P is a variable for the job position, and is a categorical variable by which, for example, a director, a manager, a general staff member, or the like is defined in advance.

In this example, also, when the test for conditional independence is performed in the above-mentioned cause-effect relationship estimation process, numerical variables are discretized as necessary, and thereby the independence test is performed. As a result, a user is able to discover and check the cause-effect relationship or the dependence relationship between variables.

In this example, it is possible to detect a diagnostic dependence relationship between members constituting the organ. Specifically, when both of two variables of a certain member are categorical variables, the statistical amount of $G^2$ is output as the strength of the dependence relationship between the two variables. In addition, when both of two variables of the certain member are numerical variables, the value of the left side of Expression (4) is output as the strength of the dependence relationship between the two variables. Further, when the two variables of a certain member are respectively a categorical variable and a numerical variable, the statistical amount of $G^2$ in a case where the numerical variable is discretized on the basis of the categorical variable is output as the strength of the dependence relationship between the two variables. Consequently, it is possible to detect, as a numerical value, the strength of the dependence relationship between the two variables.

As described above, according to the embodiment of the present technology, a user is able to analyze various kinds of data without causing awareness of the form of the variable.

Further, the present technology can be applied to not only the above-mentioned examples but also the following: a decision support apparatus that supports selection of a user; a genetic analyzer; an analyzer that performs social scientific analysis such as econometric analysis, psychology experiment analysis, survey result analysis, business analysis, or human behavior analysis; a document classification apparatus that classifies input documents; an image identification apparatus that identifies an input image; an analyzer that analyzes input information from a sensor; a recommendation apparatus that gives recommendation according to preference of a user or the like; the agent system; and the like.

It should be noted that the embodiments of the present technology are not limited to the above-mentioned embodiments, and may be modified into various forms without departing from the scope of the present technology.

For example, the present technology is able to adopt a configuration of cloud computing in which a plurality of apparatuses shares common processing of one function through a network.

Further, each step described in the above-mentioned flowchart can be not only executed by one apparatus but also executed by a plurality of apparatuses in a shared manner.

Furthermore, when one step includes a plurality of processes, the plurality of processes included in one step can be not only executed by one apparatus but also executed by a plurality of apparatuses in a shared manner.

The present technology is able to adopt the following configurations:

(1) An information processing apparatus that tests independence between multiple variables, the information processing apparatus including: a discretization section that discretizes at least one numerical variable on the basis of at least one categorical variable, when the categorical variable and the numerical variable are included in at least two dependent variables in a graphical model and a set of conditional variables serving as conditions of independence between the two variables; and a test execution section that executes a test for conditional independence between the two variables by using the categorical variable and a discrete variable which is obtained by discretizing the numerical variable.

(2) The information processing apparatus according to (1), in which when one of the two variables is the categorical variable, the discretization section discretizes the other of the two variables and the numerical variable included in the set of conditional variables, on the basis of one of the two variables.

(3) The information processing apparatus according to (1) or (2), in which when only any one of variables constituting the set of conditional variables is the categorical variable, the discretization section discretizes the two variables and the other variables constituting the set of conditional variables, as the numerical variables, on the basis of the categorical variable.

(4) The information processing apparatus according to any one of (1) to (3), further including a determination section that determines whether or not the independence between the two variables is rejected, in any of the tests for conditional independence between the two variables, when the tests for conditional independence between the two variables are executed by respectively using the two or more categorical variables, in which when it is determined that the independence between the two variables is rejected, the test execution section terminates execution of the test for conditional independence between the two variables.

(5) The information processing apparatus according to (4), in which when both of the two variables are the categorical variables, in any of the tests for conditional independence between the two variables executed by respectively using the two variables, the determination section determines whether or not the independence between the two variables is rejected.

(6) The information processing apparatus according to (4), in which when both of the two variables are the numerical variables and the set of conditional variables includes the two or more categorical variables, in any of tests for conditional independence between the two variables executed by respectively using the categorical variables, the determination section determines whether or not the independence between the two variables is rejected.

(7) The information processing apparatus according to any one of (4) to (6), in which after the tests for conditional independence between the two variables are executed on a predetermined number of pairs of variables, in any of the tests for conditional independence between the two variables executed by respectively using the categorical variables, the determination section determines whether or not the independence between the two variables is rejected.

(8) The information processing apparatus according to any one of (1) to (7), in which when there is a plurality of the categorical variables which are criteria of discretization, the discretization section discretizes the numerical variable on the basis of the categorical variable which is designated by a user.

(9) The information processing apparatus according to any one of (1) to (8), in which the categorical variable includes at least a variable which categorizes persons, and in which the numerical variable includes at least a variable which indicates a numerical value of a human body.

(10) The information processing apparatus according to any one of (1) to (8), in which the categorical variable includes at least a variable which categorizes either or both of a product and a manufacturing apparatus that manufactures the product, and in which the numerical variable includes at least a variable which indicates a value relating to either or both of the product and an environment where the product is manufactured.

(11) An information processing method of causing an information processing apparatus to test independence between multiple variables, the information processing method including: discretizing at least one numerical variable on the basis of at least one categorical variable, when the categorical variable and the numerical variable are included in at least two dependent variables in a graphical model and a set of conditional variables serving as conditions of independence between the two variables; and executing a test for conditional independence between the two variables by using the categorical variable and a discrete variable which is obtained by discretizing the numerical variable.

(12) A program causing a computer to execute processes for testing independence between multiple variables, the processes including: discretizing at least one numerical variable on the basis of at least one categorical variable, when the categorical variable and the numerical variable are included in at least two dependent variables in a graphical model and a set of conditional variables serving as conditions of independence between the two variables; and executing a test for conditional independence between the two variables by using the categorical variable and a discrete variable which is obtained by discretizing the numerical variable.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus, comprising:
one or more processors configured to:
discretize at least one numerical variable by a categorical variable, based on inclusion of the categorical variable and the at least one numerical variable in at least one of a plurality of dependent variables in a graphical model and based on a set of conditional variables that corresponds to conditions of independence between a first variable and a second variable;
generate a test result based on a test for a conditional independence between the first variable and the second variable, wherein the test for the conditional independence is based on the categorical variable and the discretized at least one numerical variable;
generate graphical information based on the test result; and
output the graphical information to an output interface.

2. The information processing apparatus according to claim 1,
wherein based on a determination that the first variable is the categorical variable, the one or more processors are further configured to discretize the second variable and the at least one numerical variable included in the set of conditional variables based on the first variable.

3. The information processing apparatus according to claim 1,
wherein based on a determination that only one of variables constituting the set of conditional variables is the categorical variable, the one or more processors are further configured to discretize the first variable and the second variable and the variables constituting the set of conditional variables, as numerical variables, based on the categorical variable.

4. The information processing apparatus according to claim 1,
wherein the one or more processors are further configured to:
determine whether the conditional independence between the first variable and the second variable is rejected in any test of a plurality of tests for the conditional independence between the first variable and the second variable, wherein the plurality of tests for the conditional independence between the first variable and the second variable are based on at least two categorical variables; and
terminate the test for the conditional independence between the first variable and the second variable based on a second determination that the conditional independence between the first variable and the second variable is rejected.

5. The information processing apparatus according to claim 4,
wherein based on a determination that the first variable and the second variable are categorical variables in any test of the plurality of tests for the conditional independence between the first variable and the second variable based on the first variable and the second variable, the one or more processors are further configured to determine whether the conditional independence between the first variable and the second variable is rejected.

6. The information processing apparatus according to claim 4,
wherein based on a determination that the first variable and the second variable are numerical variables and the set of conditional variables includes the at least two categorical variables in any test of the plurality of tests for the conditional independence between the first variable and the second variable based on categorical variables, the one or more processors are further configured to determine whether the conditional independence between the first variable and the second variable is rejected.

7. The information processing apparatus according to claim 4,
wherein based on the plurality of tests for the conditional independence between the first variable and the second variable on a determined number of pairs of variables, in any test of the plurality of tests for the conditional independence between the first variable and the second variable based on the at least two categorical variables, the one or more processors are further configured to determine whether the conditional independence between the first variable and the second variable is rejected.

8. The information processing apparatus according to claim 1,
wherein based on a plurality of categorical variables as criteria of discretization, the one or more processors are further configured to discretize the at least one numerical variable based on a user designated categorical variable.

9. The information processing apparatus according to claim 1,
wherein the categorical variable includes at least a third variable which categorizes persons, and
wherein the at least one numerical variable includes at least a fourth variable which indicates a numerical value of a human body.

10. The information processing apparatus according to claim 1,
wherein the categorical variable includes at least a third variable which categorizes at least one of a product or a manufacturing apparatus that manufactures the product, and
wherein the at least one numerical variable includes at least a fourth variable which indicates a value associated with at least one of the product or an environment where the product is manufactured.

11. An information processing method, comprising:
discretizing at least one numerical variable using a categorical variable, based on inclusion of the categorical variable and the at least one numerical variable in at least one of plurality of dependent variables in a graphical model and based on a set of conditional variables that corresponds to conditions of independence between a first variable and a second variable;
generating a test result based on a test for a conditional independence between the first variable and the second variable, wherein the test for the conditional independence is based on the categorical variable and the discretized at least one numerical variable;
generating graphical information based on the test result; and
outputting the graphical information to an output interface.

12. A non-transitory computer-readable medium having stored thereon, computer-executable instructions which, when executed by a computer, cause the computer to execute operations, the operations comprising:
discretizing at least one numerical variable using a categorical variable, based on inclusion of the categorical variable and the at least one numerical variable in at least one of plurality of dependent variables in a graphical model and based on a set of conditional variables that corresponds to conditions of independence between a first variable and a second variable;
generating a test result based on a test for a conditional independence between the first variable and the second variable, wherein the test for the conditional independence is based on the categorical variable and the discretized at least one numerical variable;
generating graphical information based on the test result; and
outputting the graphical information to an output interface.

* * * * *